United States Patent
Ahn et al.

(10) Patent No.: US 10,833,297 B2
(45) Date of Patent: Nov. 10, 2020

(54) JELLY ROLL TAPE FOR RECHARGEABLE BATTERY AND RECHARGEABLE BATTERY HAVING THE SAME

(71) Applicant: Samsung SDI Co., Ltd., Yongin-si (KR)

(72) Inventors: Jeongchull Ahn, Yongin-si (KR); Seongja Noh, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 518 days.

(21) Appl. No.: 14/323,683

(22) Filed: Jul. 3, 2014

(65) Prior Publication Data

US 2015/0171383 A1  Jun. 18, 2015

(30) Foreign Application Priority Data

Dec. 16, 2013 (KR) .................... 10-2013-0156451

(51) Int. Cl.
| | |
|---|---|
| *H01M 2/02* | (2006.01) |
| *H01M 10/04* | (2006.01) |
| *C09J 7/10* | (2018.01) |
| *H01M 2/16* | (2006.01) |
| *H01M 10/0569* | (2010.01) |

(52) U.S. Cl.
CPC ............ *H01M 2/0287* (2013.01); *C09J 7/10* (2018.01); *H01M 2/1646* (2013.01); *H01M 2/1653* (2013.01); *H01M 2/1686* (2013.01); *H01M 10/0431* (2013.01); *H01M 10/0481* (2013.01); *H01M 10/0569* (2013.01); *C09J 2203/33* (2013.01); *C09J 2409/00* (2013.01); *H01M 2300/0028* (2013.01); *Y10T 428/2848* (2015.01); *Y10T 428/2883* (2015.01)

(58) Field of Classification Search
None
See application file for complete search history.

(56) References Cited

U.S. PATENT DOCUMENTS

| | | | |
|---|---|---|---|
| 9,755,207 B2 | 9/2017 | Kawabe et al. | |
| 2008/0241674 A1* | 10/2008 | Kim | H01M 2/14 |
| | | | 429/164 |

(Continued)

FOREIGN PATENT DOCUMENTS

| | | |
|---|---|---|
| EP | 2 477 252 A1 | 7/2012 |
| JP | 11-176475 A | 7/1999 |

(Continued)

OTHER PUBLICATIONS

Dielectric corporation, Polystyrene: general material properties, Jul. 2012, 1.*

(Continued)

*Primary Examiner* — Daniel S Gatewood
(74) *Attorney, Agent, or Firm* — Knobbe, Martens, Olson & Bear, LLP

(57) ABSTRACT

A jelly roll tape for a rechargeable battery and a rechargeable battery having the same are disclosed. In one aspect, the jelly roll tape includes a first adhesive layer configured to develop an adhesive property based at least in part on a reaction with an electrolytic solution and a second adhesive layer formed on at least one surface of the first adhesive layer. The second adhesive layer is formed at least partially of a rubber-based material.

12 Claims, 3 Drawing Sheets

(56) References Cited

U.S. PATENT DOCUMENTS

| | | | |
|---|---|---|---|
| 2011/0008672 A1* | 1/2011 | Kim | H01M 2/0277 |
| | | | 429/174 |
| 2011/0143190 A1 | 6/2011 | Cho et al. | |
| 2011/0244318 A1 | 10/2011 | Cho et al. | |
| 2011/0287302 A1* | 11/2011 | Kim | H01M 2/022 |
| | | | 429/163 |
| 2012/0107573 A1* | 5/2012 | Iwata | C09J 7/021 |
| | | | 428/189 |
| 2012/0115025 A1* | 5/2012 | Kim | H01M 10/0413 |
| | | | 429/186 |
| 2012/0219835 A1 | 8/2012 | Kawabe et al. | |

FOREIGN PATENT DOCUMENTS

| | | |
|---|---|---|
| JP | 2008-521964 A | 6/2008 |
| JP | 2011-243553 A | 12/2011 |
| JP | 2012-099227 A | 5/2012 |
| JP | 2013-004195 A | 1/2013 |
| KR | 10-2006-0037852 A | 5/2006 |
| KR | 10-2011-0067915 A | 6/2011 |
| KR | 10-2012-0035090 A | 4/2012 |
| KR | 10-2012-0046056 A | 5/2012 |
| KR | 10-2012-0098526 A | 9/2012 |
| KR | 10-2013-0124053 A | 11/2013 |
| KR | 1020130124053 A1 * | 11/2013 |

OTHER PUBLICATIONS

Extended European Search Report dated May 7, 2015 for European Patent Application No. EP 14 189 041.8 which shares priority of Korean Patent Application No. KR 10-2013-0156451 with captioned U.S Appl. No. 14/323,683, and cites the above-identified references numbered 1-2.

Japanese Office Action dated Oct. 29, 2018 for Japanese Patent Application No. JP 2014-207815 which cites the above-identified references numbered 1-4 and which shares priority of Korean Patent Application No. KR 10-2013-0156451 with subject U.S. Appl. No. 14/323,683.

First Chinese Office Action dated Aug. 1, 2018 for Chinese Patent Application No. CN 201410390513.8 which shares priority of Korean Patent Application No. KR 10-2013-0156451 with subject U.S. Appl. No. 14/323,683. The Office Action cites US2008/0241674A1 and corresponding KR10-2013-0124053(A).

Korean Notification of Reason for Refusal dated Oct. 25, 2019 for Korean Patent Application No. KR 10-2013-0156451, which cites the above-identified references numbered 4-6, and from which subject U.S. Appl. No. 14/323,683 claims priority.

* cited by examiner

JELLY ROLL TAPE FOR RECHARGEABLE BATTERY AND RECHARGEABLE BATTERY HAVING THE SAME

CROSS-REFERENCE TO RELATED APPLICATIONS

This application claims the benefit of Korean Patent Application No. 10-2013-0156451 filed on Dec. 16, 2013, the contents of which are incorporated herein by reference in their entirety.

BACKGROUND

Field

The described technology generally relates to a jelly roll tape for a rechargeable battery and a rechargeable battery having the same.

Description of the Related Technology

Rechargeable batteries include a case which houses an electrode assembly including a positive electrode plate, a negative electrode plate, and a separator interposed between the positive and negative electrode plates with an electrolyte. Rechargeable batteries can be classified based on the shapes of their cases, and for example, include cylindrical, prismatic, and pouch types. Alternatively, rechargeable batteries can be classified based on the electrolyte used, into polymer electrolyte rechargeable batteries and non-aqueous electrolyte types.

SUMMARY OF CERTAIN INVENTIVE ASPECTS

One inventive aspect is a jelly roll tape for a rechargeable battery and a rechargeable battery having the same, which can increase battery stability by preventing an electrode assembly from moving within a battery case and can further protect edge portions of battery from damage due to external impact.

Another aspect is a jelly roll tape for an electrode assembly of a rechargeable battery, which does not shrink and has an increased adhesiveness when reacting with an electrolyte. Thus, the jelly roll tape allows the electrode assembly to properly function without local changes in the battery thickness and further strengthening the adhesion of the electrode assembly at edge portions of battery.

Another aspect is a rechargeable battery which has stability against external impact and can substantially prevent an electrode assembly from moving within a case.

Another aspect is a jelly roll tape for an electrode assembly of a rechargeable battery, the jelly roll tape including an adhesive tape reacting with an electrolytic solution and developing and exhibiting an adhesive property and an adhesive layer formed on at least one surface of the adhesive tape, wherein the adhesive layer is a rubber-based adhesive layer.

The adhesive tape may be an oriented polystyrene (OPS) film. The jelly roll tape may further include an electrolyte insoluble film that is not dissolved in the electrolytic solution, the electrolyte insoluble film formed between the adhesive tape and the adhesive layer formed on at least one surface of the adhesive tape.

The adhesive layer may be a rubber-based adhesive layer.

The thickness of the electrolyte insoluble film may be adjusted to control a distance between the electrode assembly and the case.

Another aspect is a rechargeable battery including an electrode assembly including a first electrode plate, a second electrode plate having a different polarity from the first electrode plate, and a separator interposed between the first electrode plate and the second electrode plate, an electrolytic solution, an electrode assembly jelly roll tape adhered to an outer surface of the electrode assembly, and a case housing the electrode assembly and the electrolytic solution, wherein the electrode assembly jelly roll tape is the jelly roll tape.

Another aspect is a jelly roll tape for an electrode assembly of a rechargeable battery, the jelly roll tape including a first adhesive layer configured to develop an adhesive property based at least in part on a reaction with an electrolytic solution and a second adhesive layer formed on at least one surface of the first adhesive layer, wherein the second adhesive layer is formed at least partially of a rubber-based material.

The first adhesive layer comprises an oriented polystyrene (OPS) film. The electrode assembly jelly roll tape is a seal tape. The rubber-based material includes one or more of natural rubber, polyisoprene rubber, styrene-butadiene rubber, styrene-isoprene rubber, styrene-isoprene-styrene block copolymer rubber, styrene-butadiene-styrene block copolymer rubber, styrene-ethylene-butylene-styrene block copolymer rubber, styrene-ethylene-propylene-styrene block copolymer rubber, styrene-ethylene-propylene block copolymer rubber, reclaimed rubber, butyl rubber, polyisobutylene, and modified rubbers thereof.

The jelly roll tape has a thickness in the range of about 20 µm to about 50 µm. The OPS film has a tensile strength in the range of about 200 kgf/cm$^2$ to about 600 kgf/cm$^2$. The jelly roll tape further includes an electrolyte insoluble film interposed between the first and second adhesive layers. The electrolyte insoluble film is formed of one or more of polyethyleneterephthalate (PET), polyimide (PI), polyethylene (PE), and polypropylene (PP). The electrolyte insoluble film is adhered to the first and second adhesive layers.

Another aspect is a rechargeable battery including an electrode assembly including a first electrode plate, a second electrode plate having a different polarity than the first electrode plate, and a separator interposed between the first and second electrode plates, an electrolytic solution, a jelly roll tape attached to an outer surface of the electrode assembly, and a case housing the electrode assembly and the electrolytic solution, wherein the jelly roll tape includes a first adhesive layer configured to develop an adhesive property based at least in part on a reaction with the electrolytic solution and a second adhesive layer formed on at least one surface of the first adhesive layer, wherein the second adhesive layer is formed at least partially of a rubber-based material.

The separator is wrapped around the electrode assembly to form the outermost surface of the electrode assembly. The rechargeable battery is a pouch-type rechargeable battery. The electrolytic solution includes a non-aqueous organic solvent and a lithium salt and the non-aqueous organic solvent includes at least one material selected from the group of one or more cyclic carbonate selected from ethylene carbonate (EC), propylene carbonate (PC), 1,2-butylene carbonate, 2,3-butylene carbonate 1,2-pentylene carbonate, and 2,3-pentylene carbonate, one or more linear carbonates selected from diethyl carbonate (DEC), dipropyl carbonate (DPC), methylpropyl carbonate (MPC), ethylmethyl carbonate (EMC), and ethylpropyl carbonate (EPC); one or more esters selected from methylacetate, ethylacetate, propylacetate, methyl propionate, ethyl propionate, γ-butyrolactone, γ-valerolactone, γ-caprolactone, δ-valerolactone, and ε-caprolactone, one or more ethers selected from tetrahydrofuran, and 2-methyltetrahydrofuran, dibutylether, and polymethylvinyl ketone.

The jelly roll tape is attached to the separator. The separator is formed at least partially of polyethylene (PE) or polypropylene (PP). The rechargeable battery further includes a ceramic layer formed on the separator. The rechargeable battery further includes a rubber-based adhesive layer formed on the ceramic layer.

Another aspect is a rechargeable battery including an electrode assembly, an electrolyte, a first adhesive layer attached to an outer surface of the electrode assembly and configured to become an adhesive upon contacting the electrolyte, and a second adhesive layer formed on at least one surface of the first adhesive layer, wherein the second adhesive layer is formed of a rubber-based material.

The rechargeable battery further includes an electrolyte insoluble film interposed between the first and second adhesive layers. The electrolyte insoluble film is formed one or more of polyethyleneterephthalate (PET), polyimide (PI), polyethylene (PE), and polypropylene (PP).

According to at least one embodiment, since the jelly roll tape for an electrode assembly of a rechargeable battery does not shrink in use, local increases in the battery thickness are substantially prevented even after prolonged use. In addition, since the jelly roll tape does not constrict the electrode assembly, charging and discharging can be easily performed on electrode plates of the electrode assembly, thereby improving the life characteristics of the battery.

Further, since the jelly roll tape has a relatively low shrinking ratio even at a high temperature, it has excellent high temperature characteristics.

In addition, since the adhesiveness of the jelly roll tape is maintained even after contact with an electrolyte, it is possible to prevent the electrode assembly from rotating or moving within a case of the battery, thereby further increasing shock resistance at edge portions which are vulnerable to external impact.

Additional aspects and/or advantages of the described technology will be set forth in part in the description which follows and in part will be obvious from the description or may be learned by practice of the described technology.

DETAILED DESCRIPTION OF CERTAIN INVENTIVE EMBODIMENTS

Figure 1:
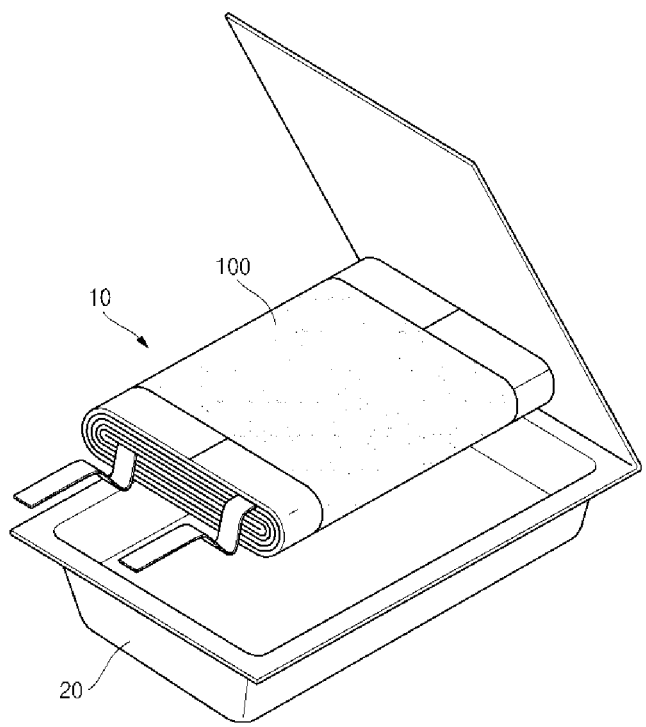
FIG. 1 is a perspective view of a pouch-type rechargeable battery having a jelly roll tape for an electrode assembly according to an embodiment.

In the standard rechargeable battery, the electrode assembly accommodated in the case can rotate or move within the case when applied with an external vibration or shock. This movement can cause a short-circuit in the battery, leading to damage to the electrode tabs of the electrode assembly.

In order to prevent an electrode assembly from unrolling or moving within a battery case, a jelly roll tape is attached to the outer surface of the electrode assembly. Alternatively, the jelly roll tape can be independently attached to a seal tape formed on the electrode assembly. However, the adhesiveness of the conventional jelly roll tape, particularly when it is used in a polymeric battery, is not strong enough to withstand external impacts. Further, the jelly roll tape can be peeled off or the adhesiveness of the tape lost when it reacts with an electrolytic solution. After reacting with the electrolytic solution the jelly roll tape can shrink and constrict the electrode assembly, causing damage to the electrode assembly. In addition, the overall thickness of the electrode assembly can increase in some regions due to the reaction, resulting in a non-uniform battery thickness which can lead to short-circuits.

Hereinafter, the described technology will be described in detail. In the following description, embodiments of the described technology are provided and described for a better understanding of the described technology. It will be understood by one skilled in the art that these embodiments may be modified in various forms and are not to be considered limiting of the scope of the described technology.

<Jelly Roll Tape of Electrode Assembly>

According to an embodiment, a jelly roll tape for use in an electrode assembly includes an adhesive tape (or first adhesive layer) that reacts with an electrolytic solution and has an adhesive property, and an adhesive layer (or second adhesive layer) formed on at least one surface of the adhesive tape.

The adhesive tape may be, for example, an oriented polystyrene (OPS) film. A rubber-based adhesive layer may be used as the adhesive layer. When the rubber-based adhesive layer is used as the adhesive layer, the jelly roll tape has a sufficiently high adhesiveness when it is employed in a polymer battery.

According to an embodiment, the jelly roll tape has a thickness that is as small as possible in consideration of battery capacity. However, in some embodiments, in order to prevent the jelly roll tape from being broken due to external force, the jelly roll tape has a thickness of at least about 20 μm, for example, in the range of about 20 μm to about 50 μm. However, in other embodiments, the jelly roll tape has a thickness of less than about 20 μm or greater than about 50 μm.

According to some embodiments, the adhesive tape has a tensile strength of about 200 kgf/cm$^2$, for example, in the range of about 200 kgf/cm$^2$ to about 600 kgf/cm$^2$ so that the adhesive tape can withstand the pressure applied during charging or discharging. If the tensile strength of the adhesive tape is greater than or equal to about 600 kgf/cm$^2$, the adhesive tape may not be released properly from a storage roll, thereby reducing the workability of the tape. In addition, the OPS film may be torn easily, thereby resulting in manufacturing errors or failures. However, according to other embodiments, the tensile strength of the adhesive tape can be less than about 200 kgf/cm$^2$ or greater than about 600 kgf/cm$^2$.

According to an embodiment, the rubber-based adhesive layer includes natural rubber, polyisoprene rubber, styrene-butadiene rubber (SBR), styrene-isoprene rubber, styrene-isoprene-styrene block copolymer rubber, styrene-butadiene-styrene block copolymer rubber, styrene-ethylene-butylene-styrene block copolymer rubber, styrene-ethylene-propylene-styrene block copolymer rubber, styreneethylene-propylene block copolymer rubber, reclaimed rubber, butyl rubber, polyisobutylene, or modified rubbers thereof.

According to some embodiments, the jelly roll tape is formed of multiple layers including the adhesive tape, for example, an OPS film, the adhesive layer formed on at least one surface of the adhesive tape, and an electrolyte insoluble film that is not dissolved when placed in an electrolytic solution interposed between the adhesive tape and the adhesive layer. With this configuration, the jelly roll tape can withstand shocks applied to the battery, irrespective of the kind of electrode assembly.

The electrolyte insoluble film may include, for example, polyethyleneterephthalate (PET), polyimide (PI), polyethylene (PE), or polypropylene (PP).

According to at least one embodiment, the adhesive layer formed on at least one surface of the adhesive tape (e.g., the OPS film) is a rubber-based adhesive layer and maintains its adhesiveness even when it reacts with an electrolyte.

<Rechargeable Battery>

According to an embodiment, the rechargeable battery includes an electrode assembly including a first electrode plate, a second electrode plate having a different polarity from the first electrode plate, and a separator interposed between the first and second electrode plates. The rechargeable battery also includes an electrolytic solution, an electrode assembly jelly roll tape adhered to an outer surface of the electrode assembly, and a case housing the electrode assembly and the electrolytic solution. Here, the electrode assembly jelly roll tape according to at least one embodiment is used in the rechargeable battery.

The first electrode plate is a positive or negative electrode and the second electrode plate is an electrode having a different polarity from the first electrode plate.

The rechargeable battery may be of any one of a cylindrical, prismatic battery, or pouch type battery based on the external shape of the case. The jelly roll tape has excellent performance when it is employed in a pouch type rechargeable battery. Compared to prismatic or cylindrical rechargeable batteries, pouch-type rechargeable batteries have relatively vulnerable edge portions (R). However, according to at least one embodiment, since the electrode assembly jelly roll tape does not lose its adhesiveness even when it comes into contact with an electrolyte, it is possible to substantially prevent the electrode assembly from moving within the case and the jelly roll tape is not easily released when impacted by external force, thereby increasing the safety of the battery.

In addition, rechargeable batteries can be classified into polymer batteries and non-aqueous batteries based on the electrolyte used. According to at least one embodiment, the rechargeable battery has superior performance when it is a polymer battery. This is because the rubber-based adhesive layer maintains an adhesive force between the adhesive tape (e.g., OPS) and the electrode assembly. That is to say, in a cylindrical rechargeable battery, the same battery performance can be obtained by using only an acrylate adhesive layer.

Electrolyte

Electrolytes are classified into polymer and non-aqueous electrolytes. When a polymer electrolyte is used, it may further include a lithium salt and a non-aqueous electrolytic solution.

The non-aqueous electrolyte is used in dissolving or dissociating the lithium salt and any type of electrolyte can be used without particular limitation as long as it is used as an electrolyte solvent.

Examples of the non-aqueous electrolytic solutions include cyclic carbonate, linear carbonate, lactone, ether, ester, sulfoxide, acetonitrile, lactam, ketone, and halogen derivatives thereof, which are used alone or in combination of two or more of these materials. Examples of the cyclic carbonate include ethylene carbonate (EC), propylene carbonate (PC), butylene carbonate (BC), fluoroethylene carbonate (FEC), and so on, and examples of the linear carbonate include diethyl carbonate (DEC), dipropyl carbonate (DPC), ethyl methyl carbonate (EMC), methyl propyl carbonate (MPC), and so on. Examples of the lactone include gamma utyrolactone (GBL), and examples of the ether include dibutylether, tetrahydrofuran, 2-methyl tetrahydrofuran, 1,4-dioxane, 1,2-dimethoxyethane, 1,2-diethoxyethane, and so on. Examples of the ester include methyl formate, ethyl formate, propyl formate, methyl acetate, ethyl acetate, propyl acetate, methyl propionate, ethyl propionate, butyl propionate, methyl pivalate, and so on. Examples of the sulfoxide include dimethylsulfoxide, examples of the lactam include N-methyl-2-pyrrolidone (NMP), and examples of the ketone include polymethyl vinyl ketone. Additionally, halogen derivatives of the aforementioned materials may also be used, but the described technology is not limited to the listed solvents of the electrolytic solution. In addition, the solvents of the electrolytic solution can be used alone or in combination of two or more of these materials.

The lithium salt is a material that is readily soluble in the above-mentioned non-aqueous electrolyte. Nonlimiting examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide. Additionally, in order to improve the charge/discharge characteristics and flame retardancy, an additive may be further added to the electrolyte. Nonlimiting examples of such an additive include pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidone, ethylene glycol dialkyl ether, ammonium salts, pyrrole, 2-methoxy ethanol, aluminum trichloride, or the like. If desired, in order to curb combustibility, the non-aqueous electrolyte may further include halogen-containing solvents such as carbon tetrachloride or ethylene trifluoride. In some embodiments, in order to improve incombustibility, the non-aqueous electrolyte additionally includes a halogen containing solvent, such as carbon tetrachloride or trifluoroethylene. Further, in order to improve high-temperature storage characteristics, the non-aqueous electrolyte may additionally include carbon dioxide gas.

Negative Electrode

In one embodiment, the negative electrode is prepared by a general method that is widely known in the art. For example, a slurry is prepared by mixing a binder, an organic solvent, if necessary, a conductive agent, and a dispersant, and stirring the mixture. The slurry is coated on a metal current collector and is compressed and subsequently dried, thereby preparing the negative electrode.

According to an embodiment, the negative electrode slurry is prepared using a mixture including about 70 wt % to about 98 wt % of a negative electrode active material, about 1 wt % to about 30 wt % of a binder, and about 1 wt % to about 25 wt % of a conductive agent.

The negative electrode active material is a high-capacity negative electrode active material. According to an embodiment, the negative electrode active material includes one or more of a Si-based active material, a Sn-based active material or alloys thereof, or may be used in combination with graphite.

According to some embodiments, the Si-based negative electrode active material is prepared by adding silicon oxide (SiOx, $0.1 \leq x \leq 1.2$), amorphous silicon or alloys with other elements added to silicon. Examples of the elements include one or more selected from the group consisting of Mg, Ca, Sr, Sn, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Ti, Ge, P, As, Sb, Bi, S, Se, and Te.

According to some embodiments, the Sn-based negative electrode active material includes tin (Sn), tin oxide ($SnO_2$) or alloys with other elements added to Sn. Examples of the elements include one or more selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Si, In, Ti, Ge, P, As, Sb, Bi, S, Se, and Te.

The binder may include, for example, SBR, polyamideimide (PAI), polyvinylidene fluoride (PVDF), polyethylene, polypropylene, polytetrafluoroethylene (PTFE), but is not limited thereto.

Examples of the conductive agent include, but are not limited to, carbon black, ketjen black, acetylene black, artificial graphite, carbon fibers, carbon nano tubes, amorphous carbon, and so on.

In one embodiment, the slurry is prepared by mixing an SBR binder emulsion with water and homogenizing the mixture with the negative electrode active material or the conductive agent.

In some embodiments, the metal current collector is formed using a metallic material. Any kind of metal can be used so long as it is a highly conductive metal to which the slurry of the negative electrode active material can be easily adhered without causing a chemical reaction in the voltage range of the fabricated battery. Representative examples of the metal current collector include copper, nickel, stainless steel, or combinations thereof in the form of a mesh or a foil, but the described technology is not limited thereto.

There is no particular limit to the method of coating the slurry on the current collector. For example, the slurry may be coated on the current collector by a doctor blade, submersion, or brushing. In addition, there is no particular limit to the amount of the slurry coated on the current collector, but the slurry is generally coated to have a thickness of an active material layer formed after removing a solvent or a dispersing medium in the range of about 0.005 mm to about 5 mm, for example, about 0.01 mm to about 0.1 mm.

Further, there is no particular limit to the method of removing the solvent or dispersing medium, so long as the solvent or dispersing medium can be evaporated as fast as possible within a speed capable of substantially preventing stress concentrations and thus cracks from occurring in the active material layer or substantially preventing the active material layer from being peeled off from the current collector. In an exemplary embodiment, the drying is performed in a vacuum oven at a temperature of about 50° C. to about 200° C. for about 0.5 days to about 3 days.

Positive Electrode

In one embodiment, a lithium containing transition metal oxide is used as a positive electrode active material for the positive electrode of the rechargeable battery. Specific examples thereof include one or more selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ ($0\leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<Z<2$), $LiCoPO_4$, and $LiFePO_4$.

The positive electrode is fabricated using the positive electrode active material by the general method known in the art and the other content regarding preparation of the positive electrode is generally known in the art and detailed descriptions thereof will be omitted.

Separator

In one embodiment, the separator is interposed between the positive and negative electrodes. An insulating thin film having good ion permeability and mechanical strength can be used as the separator.

In one embodiment, the separator has a pore diameter of about 0.01 μm to about 10 μm and a thickness of about 5 μm to about 300 μm. A sheet or non-woven fabric made of an olefin polymer such as polypropylene and/or a glass fiber or polyethylene, which has chemical resistance and hydrophobicity, can be used as the separator. However, in other embodiments, the pore diameter of the separator can be less than about 0.01 μm or greater than about 10 μm and have a thickness of less than about 5 μm or greater than about 300 μm.

Specific examples of the olefin polymer used as the separator include polyethylene, polypropylene, polytetrafluoroethylene (PTFE), multi-layered structures having two or more layers of these materials, composite multi-layered structures such as polyethylene/polypropylene two layered separators, polyethylene/polypropylene/polyethylene three layered separators, or polypropylene/polyethylene/polypropylene three layered separators.

According to an embodiment, the outermost surface of the electrode assembly is further wrapped by the separator one more turns. Adhesion between electrode assembly and the jelly roll tape is increased when the electrode assembly is wrapped by the separator compared to when the electrode assembly is wrapped by the positive electrode active material or the negative electrode active material.

Hereinafter, a rechargeable battery including the negative electrode according to an embodiment will be described with reference to FIG. 1.

FIG. 1 is a perspective view of a pouch-type rechargeable battery according to an embodiment. A method for fabricating the rechargeable battery is provided for a better understanding of the described technology and may be appropriately modified using technical content known in the art.

Referring to FIG. 1, the rechargeable battery includes a case 20, an electrode assembly 10 accommodated in the case 20, and a jelly roll tape 100 adhered to the outer surface of the electrode assembly 10.

Figure 2:
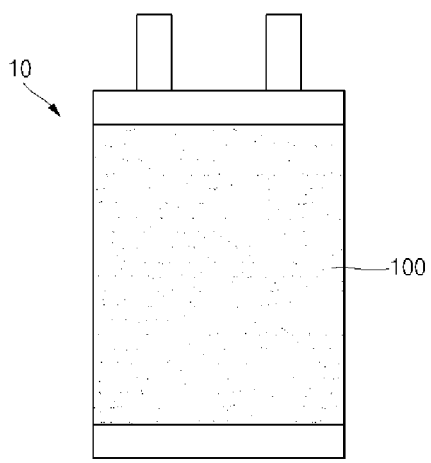
FIG. 2 illustrates an example of the jelly roll tape shown in FIG. 1 used as a seal tape.

Referring to FIG. 2, an embodiment of the jelly roll tape 100 used as a seal tape is illustrated. The jelly roll tape 100 is used as the seal tape of the electrode assembly according to an embodiment.

Figure 3:
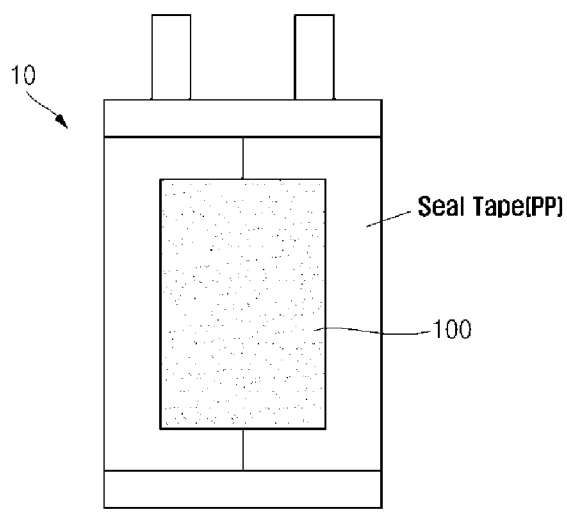
FIG. 3 illustrates a use example in which the jelly roll tape shown in FIG. 1 is placed on a seal tape (e.g. PP) in an electrode assembly according to an embodiment.

Referring to FIG. 3, an embodiment of the jelly roll tape 100 placed on a seal tape (PP) is illustrated. In this embodiment, the jelly roll tape 100 is adhered to the seal tape.

Figure 4:
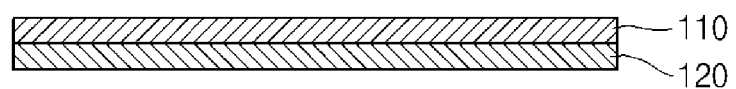
FIG. 4 is a cross-sectional view of a jelly roll tape for an electrode assembly.

Referring to FIG. 4, the jelly roll tape 100 includes an adhesive tape (e.g., an OPS film) 110 as a base material and an adhesive layer 120 formed on one surface of the OPS film 110.

Figure 5:
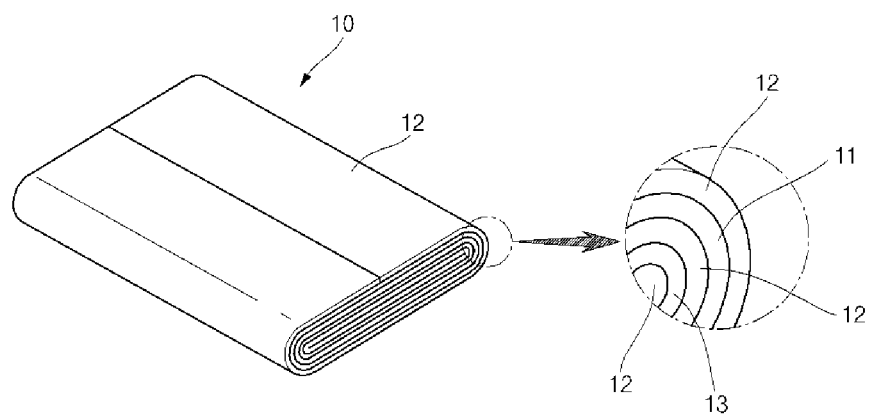
FIG. 5 is a perspective view of an electrode assembly including a jelly roll tape according to an embodiment applied to the assembly.

Referring to FIG. 5, the electrode assembly 10 is wrapped with a separator 12 such that the separator 12 forms the outermost surface of the electrode assembly 10. The electrode assembly 10 includes a first electrode plate 11 and a second electrode plate 13 with a separator 12 interposed therebetween. Thus, the separator 12 is wrapped around the first and second electrode plates 11 and 13 to form the outermost surface of the electrode assembly 10. According to some embodiments, a ceramic layer is formed on the separator 12. A rubber based adhesive layer can be formed on the ceramic layer.

Figure 6:
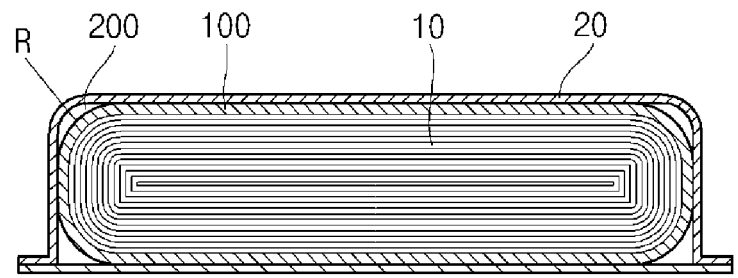
FIG. 6 is a cross-sectional view of a pouch-type rechargeable battery according to an embodiment.

Referring to FIG. 6, the jelly roll tape 100 is adhered to the electrode assembly 10 over the separator 12 as the outermost surface of the electrode assembly 10 and is then housed in the case 20. In other embodiments, the outermost portion of the electrode assembly is fixed using a typical seal tape and the jelly roll tape 100 is then be separately adhered to the typical seal tape. Thereafter, as an electrolytic solution is injected, the electrolytic solution 200 and the adhesive tape (e.g., OPS layer) as the base material of the jelly roll tape 100 react with each other to develop or exhibit adhesiveness, thereby preventing the electrode assembly 10 from moving within the battery case. This configuration leads to high resistance against external force in an impact test, such as a drop test.

Thus, according to at least one embodiment, the rechargeable battery having the jelly roll tape on the electrode assembly is protected against external impact and has a particularly increased shock resistance near edge portions R of the rechargeable battery.

The following examples are presented for illustrative purposes only and do not limit the scope of the described technology.

EXAMPLE 1

Preparation of Jelly Roll Tape of Electrode Assembly

An adhesive composition containing 70 wt % of rubber as a styrene butadiene based adhesive component is coated on a 40 μm thick OPS film (OPS25/PSA10 manufactured by SKC, Korea) to a thickness of 5 μm, followed by drying at room temperature for 24 hours. Thus, a jelly roll tape having a total thickness of 45 μm is prepared.

EXAMPLES 2-4

A jelly roll tape for an electrode assembly was prepared in the same manner as in Example 1, except that different rubber-based adhesive layers and jelly roll tape thicknesses shown in Table 1 were used.

When the thickness of the jelly roll tape is in the range of about 20 μm to about 40 μm, it was determined that the jelly roll tape had improved properties as a finishing tape in view its thickness and external appearance. However, when the thickness of the jelly roll tape is greater than or equal to about 40 μm, it was determined that the jelly roll tape had poor properties as a finishing tape in view its thickness and external appearance.

TABLE 1

|  | Example | | |
|---|---|---|---|
|  | 2 | 3 | 4 |
| Adhesive layer component | Okong SBR, Korea | Konish SBR, Japan | Ameripol Synpol SBR, America |
| Jelly roll tape thickness (μm) | 20 | 40 | 35 |

EXAMPLE 5

A jelly roll tape for an electrode assembly was prepared in the same manner as in Example 1, except that an about 6 μm thickness of PET was inserted between the OPS film and the adhesive layer.

COMPARATIVE EXAMPLE 1

A jelly roll tape for an electrode assembly was prepared in the same manner as in Example 1, except that an acryl-based adhesive layer having an acrylic ester polymer as a main component was used.

EXPERIMENTAL EXAMPLE 1

Tests of Physical Properties of Jelly Roll Tape for Electrode Assembly

The physical properties of electrode assembly jelly roll tapes prepared in Examples 1 to 5 and Comparative Example 1 were measured and the results thereof are listed in Table 2. In Table 2, OPS films used in Examples 1 to 5 and Comparative Example 1 are substantially the same films except for the adhesive components. Therefore, the basic physical properties of the films are substantially the same as each other. However, in order to investigate the characteristic physical properties of the films, each of the OPS films was adhered to an electrode assembly, dipped in an electrolytic solution, and placed in an oven to measure the shrinking properties of the OPS film. The OPS film prepared in Comparative Example 1, which includes an acryl-based adhesive layer, shrank at about 50° C. and the OPS film including a rubber-based adhesive layer did not shrink until the temperature became about 80° C., suggesting that the OPS film was better maintained by the rubber-based adhesive layer because the rubber-based adhesive layer was not readily dissolved in the electrolytic solution A mixture of 1.1M $LiPF_6$(EC/PC/EP=1/3/6)+1.2 $LiBF_4$+ 5.0% FEC (flouroethylene carbonate)+2.0% VC (vinyl carbonate)+1.0% SA (succinic anhydride)+3.0% SN (succinonitrile) was used as the electrolytic solution.

TABLE 2

|  | Comparative Example 1 (OPS40/PSA1) | Example 1 (OPS35/PSA5) | Example 2 (OPS40/PSA5/ PET6/PSA5) | Example 3 (OPS35/PSA5/ PET6/PSA5) | Example 4 (OPS20/PSA5/ PET6/PSA5) |
|---|---|---|---|---|---|
| Heat resistant temperature (° C.) in electrolyte submerged state after being adhered to electrode assembly | OPS film shrunk at 50° C. | OPS film shrunk at 80° C. | OPS film shrunk at 80° C. | OPS film shrunk at 80° C. | OPS film shrunk at 80° C. |

EXPERIMENTAL EXAMPLE 1

Each of the samples of jelly roll tapes according to Examples 1 to 5 and Comparative Example 1 were prepared by adhering OPS films to stainless metal plates, impregnated in an electrolytic solution containing 1.1M $LiPF_6$ (EC/PC/EP=1/3/6)+1.2 $LiBF_4$+5.0% FEC (flouroethylene carbonate)+2.0% VC (vinyl carbonate)+1.0% SA (succinic anhydride)+3.0% SN (succinontrile), and allowed to stand without being disturbed at a high temperature of about 60° C. for 10 days. Thereafter, the samples were taken out one by one to measure the adhesiveness and the measurement results are shown in Table 3. When the jelly roll tapes were impregnated in the electrolytic solution, the OPS films were dissolved to then react with the electrolytic solution and tended to stick to the stainless steel plates. If a jelly roll tape has adhesiveness exceeding a predetermined level (e.g., about 300 gf/25mm ↑), the adhesiveness was not affected by the reaction with the electrolytic solution.

TABLE 3

| | | | Elapsed days | | | | |
|---|---|---|---|---|---|---|---|
| | | Initial | 4 days | 11 days | 17 days | 25 days | 31 days |
| Adhesiveness (gf/25 mm) | Example 1 | 320 | 300 ↑ | 300 ↑ | 300 ↑ | 300 ↑ | 300 ↑ |
| | Example 2 | 332 | 300 ↑ | 300 ↑ | 300 ↑ | 300 ↑ | 300 ↑ |
| | Example 3 | 315 | 300 ↑ | 300 ↑ | 300 ↑ | 300 ↑ | 300 ↑ |
| | Example 4 | 345 | 300 ↑ | 300 ↑ | 300 ↑ | 300 ↑ | 300 ↑ |
| | Example 5 | 322 | 300 ↑ | 300 ↑ | 300 ↑ | 300 ↑ | 300 ↑ |
| | Comparative Example 1 | 300 | 13 | 8 | 7 | 6 | 6 |

As understood from Table 3, the jelly roll tape of the electrode assembly according to embodiments of the described technology had good adhesiveness when an acryl-based adhesive layer was used. The jelly roll tape including the acryl-based adhesive layer (Comparative Example 1) had initial adhesiveness of 300 gf/25 mm and over time, the adhesive layer was dissolved in the electrolytic solution. Eventually, after 11 days elapsed, the adhesiveness of the jelly roll tape was lowered to 10 gf/25 mm or less and the jelly roll tape lost its adhesiveness.

Although specific types of materials (adhesive compositions, electrolytic solutions, adhesive tapes, etc.) or parameters (thickness, temperature, adhesiveness, etc.) were used in the above examples 1-5, it is expected that substantially the same or similar benefits are obtained from other types of materials or parameters discussed in connection with FIGS. 1-6.

Although the described technology has been described with reference to certain exemplary embodiments thereof, it will be understood by those skilled in the art that a variety of modifications and variations may be made to the described technology without departing from the spirit or scope of the present invention defined in the appended claims.

What is claimed is:

1. A rechargeable battery, comprising:
a case configured to house an electrode assembly;
a seal tape fixing the electrode assembly; and
a jelly roll tape for the electrode assembly of a rechargeable battery, the jelly roll tape adhered to the seal tape with the seal tape interposed between the jelly roll tape and the electrode assembly, and the jelly roll tape comprising:
a first adhesive layer configured to develop an adhesive property based at least in part on a reaction with an electrolytic solution, the first adhesive layer having a tensile strength in the range of about 200 kgf/cm2 to about 600 kgf/cm2;
an electrolyte insoluble film adhered to and in direct contact with at least one surface of the first adhesive layer; and
a second adhesive layer formed on the electrolyte insoluble film opposite the first adhesive layer, wherein the second adhesive layer is formed at least 70 wt % of a rubber-based material having a thickness of at least 5 μm,
wherein the electrolyte insoluble film is at least approximately 6 μm thick and the jelly roll tape is between 20 μm and 40 μm thick,
wherein the electrolyte insoluble film is interposed between the first and second adhesive layers and is formed of polyethyleneterephthalate (PET), and
wherein the jelly roll tape has an area that is less than an area of the seal tape.

2. The rechargeable battery of claim 1, wherein the first adhesive layer comprises an oriented polystyrene (OPS) film including an acryl-based adhesive layer.

3. The rechargeable battery of claim 1, wherein the rubber-based material comprises one or more of natural rubber, polyisoprene rubber, styrene-butadiene rubber, styrene-isoprene rubber, styrene-isoprene-styrene block copolymer rubber, styrene-butadiene-styrene block copolymer rubber, styrene-ethylene-butylene-styrene block copolymer rubber, styrene-ethylene-propylene-styrene block copolymer rubber, styrene-ethylene-propylene block copolymer rubber, reclaimed rubber, butyl rubber, polyisobutylene, and modified rubbers thereof.

4. A rechargeable battery, comprising:
an electrode assembly including a first electrode plate, a second electrode plate having a different polarity than the first electrode plate, and a separator interposed between the first and second electrode plates and wrapped around the electrode assembly to form an outermost surface of the electrode assembly;
a seal tape fixing the electrode assembly;
an electrolytic solution;
a jelly roll tape adhered to the seal tape with the seal tape interposed between the jelly roll tape and the electrode assembly; and
a case housing the electrode assembly and the electrolytic solution,
wherein the jelly roll tape comprises:
a first adhesive layer configured to develop an adhesive property based at least in part on a reaction with the electrolytic solution;
an electrolyte insoluble film adhered to and in direct contact with at least one surface of the first adhesive layer; and
a second adhesive layer formed on the electrolyte insoluble film opposite the first adhesive layer, wherein the second adhesive layer is formed at least 70 wt % of a rubber-based material having a thickness of at least 5 μm,
wherein the electrolyte insoluble film is at least approximately 6 μm thick and the jelly roll tape is between 20 μm and 40 μm thick, and
wherein the electrolyte insoluble film is interposed between the first and second adhesive layers and is formed of polyethyleneterephthalate (PET).

5. The rechargeable battery of claim 4, wherein the rechargeable battery is a pouch-type rechargeable battery.

6. The rechargeable battery of claim 4, wherein the electrolytic solution includes a non-aqueous organic solvent and a lithium salt and wherein the non-aqueous organic solvent includes at least one material selected from the group consisting of: one or more cyclic carbonate selected from ethylene carbonate (EC), propylene carbonate (PC), 1,2-butylene carbonate, 2,3-butylene carbonate 1,2-pentylene carbonate, and 2,3-pentylene carbonate; one or more linear carbonates selected from diethyl carbonate (DEC), dipropyl carbonate (DPC), methylpropyl carbonate (MPC), ethylmethyl carbonate (EMC), and ethylpropyl carbonate (EPC); one or more esters selected from methylacetate, ethylacetate, propylacetate, methyl propionate, ethyl propionate, γ-butyrolactone, γ-valerolactone, γ-caprolactone, δ-valerolactone, and ε-caprolactone; one or more ethers selected from tetrahydrofuran, and 2-methyltetrahydrofuran, dibutylether; and polymethylvinyl ketone.

7. The rechargeable battery of claim 4, wherein the jelly roll tape is attached to the separator.

8. The rechargeable battery of claim 4, wherein the separator is formed at least partially of polyethylene (PE) or polypropylene (PP).

9. The rechargeable battery of claim 8, further comprising a ceramic layer formed on the separator.

10. The rechargeable battery of claim 9, further comprising a rubber-based adhesive layer formed on the ceramic layer.

11. A rechargeable battery, comprising:
an electrode assembly;
an electrolyte;
a seal tape fixing the electrode assembly;
a case housing the electrode assembly and the electrolytic solution; and
a jelly roll tape adhered to the seal tape with the seal tape interposed between the jelly roll tape and the electrode assembly, the jelly roll tape comprising:
　a first adhesive layer configured to become an adhesive upon contacting the electrolyte, the first adhesive layer having a tensile strength in the range of about 200 kgf/cm$^2$ to about 600 kgf/cm$^2$;
　an electrolyte insoluble film adhered to and in direct contact with at least one surface of the first adhesive layer; and
　a second adhesive layer formed on the electrolyte insoluble film opposite the first adhesive layer, wherein the second adhesive layer is formed at least 70 wt % of a rubber-based material having a thickness of at least 5 μm,
wherein the electrolyte insoluble film is at least approximately 6 μm thick and the jelly roll tape is between 20 μm and 40 μm thick,
wherein the electrolyte insoluble film is interposed between the first and second adhesive layers and is formed of polyethyleneterephthalate (PET).

12. The rechargeable battery of claim 1, wherein the jelly roll tape is adhered to a single side of the electrode assembly, the single side of the electrode assembly having an area that is greater than the area of the jelly roll tape.

* * * * *